United States Patent [19]

Lowry et al.

[11] 4,411,126
[45] Oct. 25, 1983

[54] CARRIAGE FOR A GRASS TRIMMING DEVICE

[76] Inventors: Joseph M. Lowry, 308 Sweetbriar Dr.; Ernest E. Griffin, 12306 Ridgefield Pkwy., both of Richmond, Va. 23233

[21] Appl. No.: 353,002

[22] Filed: Feb. 26, 1982

[51] Int. Cl.³ .............................................. A01G 3/06
[52] U.S. Cl. ..................................... 56/17.5; 56/12.7; 56/17.2
[58] Field of Search .................... 56/17.5, 16.9, 255, 56/12.7, 17.1, 17.2

[56] References Cited

U.S. PATENT DOCUMENTS

| | | | |
|---|---|---|---|
| 1,954,579 | 4/1934 | Smith | 56/255 |
| 2,793,485 | 5/1957 | Emmons et al. | 56/17.5 |
| 2,796,715 | 6/1957 | Meltzer | 56/255 |
| 3,017,733 | 1/1962 | Evans | 56/17.5 |
| 3,093,947 | 6/1963 | Whitman | 56/255 |
| 3,587,749 | 6/1971 | Sauer | 56/17.5 |

*Primary Examiner*—Jay N. Eskovitz
*Attorney, Agent, or Firm*—Cushman, Darby & Cushman

[57] ABSTRACT

A wheeled carriage frame has a platform provided with an aperture for receiving and supporting the lower portion of a housing for a grass trimming device so that the cutting element of the device will extend beneath the platform and the motor housing will extend above the platform; the platform has a releasable clamping arm for holding the motor housing in position on the platform; the platform is slidably mounted on the wheeled frame between the front and rear of the frame and gripping devices are provided for holding the platform in a desired position on the frame; the lateral width of the front and rear wheels of the frame are adjustable, as well as the height of the frame, relative to the ground by adjustable axles.

8 Claims, 5 Drawing Figures

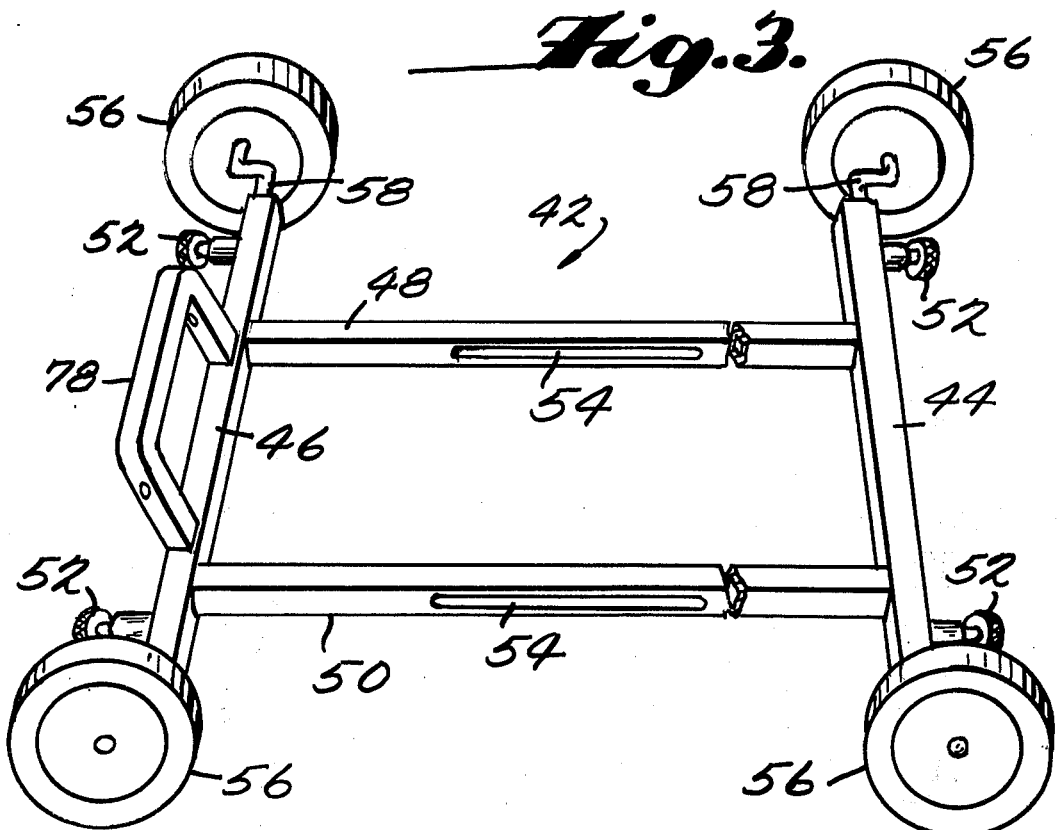
Fig. 3.
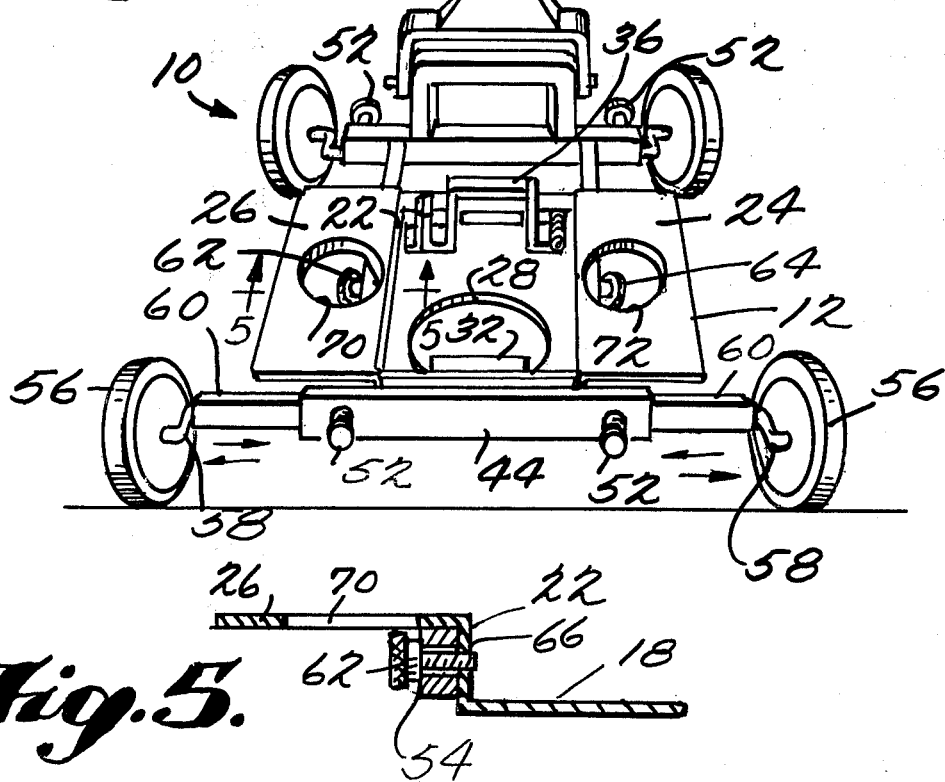
Fig. 4.
Fig. 5.

CARRIAGE FOR A GRASS TRIMMING DEVICE

BACKGROUND AND BRIEF DESCRIPTION OF THE INVENTION

The present invention relates to an improved wheeled carriage having a platform for engaging and retaining a grass or weed cutting device of the type utilizing a cable rotated by a motor output to cut grass, weeds or the like close to objects that cannot be cut by the conventional power or hand mower.

In U.S. Pat. No. 4,287,709, there is disclosed a carriage for a grass trimming device which provides in its embodiments several clamping devices for facilitating mounting of the grass trimming device on the carriage so as to securely hold the motor housing in place when in use while still permitting rapid and easy removal of the trimming device from the carriage.

In many landscaping designs, both residential and commercial, where a carriage such as that disclosed in U.S. Pat. No. 4,287,709 is employed, close trimming around stationary structures such as lawn furniture, garden walls, shrubbery or the like, may often necessitate removal of the grass trimming device from the carriage. For example, in a cemetery with a large number of grave markers, or a golf course with extensive shrubbery plantings, an undesirably large amount of time may be consumed in mouting and dismounting the grass trimming device from the carriage.

The carriage of the present invention overcomes the foregoing disadvantage by providing a platform which is slidably and adjustably mounted on a wheeled frame whereby the grass trimming device which is releasably mounted on the platform can be moved forwardly so that the cutting cable will effectively cut grass growing adjacent a fixed structure without requiring the operator of the grass trimmer to extend the length of the cutting cable as this practice frequently results in premature severance of the unduly extended cable the replacement of which, when exhausted, is a time consuming operation.

In summary, the present invention provides a platform which has an aperture through which the lower part of the motor and cutting cable extend and on the upper surface of which the housing for the motor is supported. The platform is adjustably slidable on a frame between the front and rear of the frame by a simple adjustment of a set screw type of gripping device or devices. The frame is provided with four wheels the width between each pair of which can be adjusted, as needed dictates, for a grass trimming operation. In addition, the wheels are mounted on adjustable axles to vary the height of the frame and thus the platform and grass trimming device mounted thereon. With this arrangement, an operator may easily adjust the position of the platform relative to the frame and front or rear wheels so as to be able to cut grass, weeds or the like adjacent stationary objects on a lawn without requiring dismounting of the grass trimmer from the carriage.

The foregoing and other advantages will become apparent as consideration is given to the following detailed description taken in conjunction with the accompanying drawings, in which:

BRIEF DESCRIPTION OF THE DRAWINGS

FIG. 3 is a perspective view of the frame and wheels of the carriage of the present invention;

FIG. 4 is a perspective view looking down the frame from the front wheels to the rear wheels; and FIG. 5 is a sectional view taken along lines 5—5 of FIG. 4 and showing one of the gripping devices of the carriage.

DETAILED DESCRIPTION OF THE INVENTION

Figure 1:
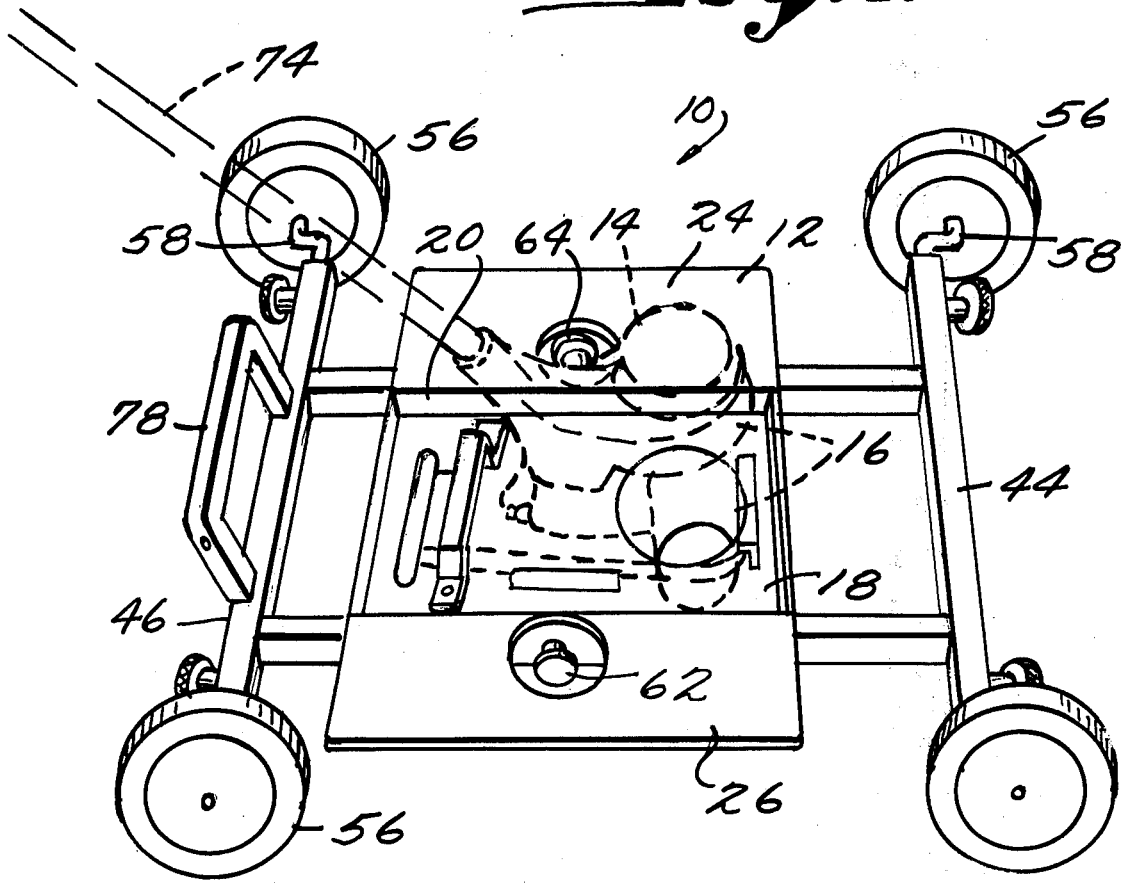
FIG. 1 is a perspective view of the carriage of the present invention.

Referring now to the drawings wherein like numerals designate corresponding parts throughout the several views, there is shown in FIG. 1 the carriage 10 of the present invention which includes the slidable platform 12 on which a grass trimming device illustrated in phantom lines at 14 may be positioned. The trimming device 14 may be of the type having a motor housing 16 and may be of either the electrically or gas driven type. In either case, a rotor (not shown) extends vertically beneath the housing 16 to which is attached, interiorly thereof, a plastic cord which is the cutting element of the trimming device 14. As is well known, the motor, be it electrical or gas driven, rotates the rotor at high speed to effect rotation of the cord. In many models, the length to which the cord extends from the rotor can be varied by the operator either prior to or during a cutting operation. For a representative illustration of the mounting of the cord and rotor relative to a platform, see the illustrations in U.S. Pat. No. 4,287,709, the disclosure of which is incorporated herein by reference.

The platform 12 consists of a bed portion 18 which is bounded by side walls 20 and 22. The bed portion 18 is recessed with respect to the plane of a pair of guard walls 24 and 26 which extend from opposite sides of the bed portion 18 from the top edges of the associated side walls 20 and 22. It will be noted that the guard walls 24 and 26 lie in the same plane which plane is parallel to the plane in which the bed portion 18 lies.

Figure 2:
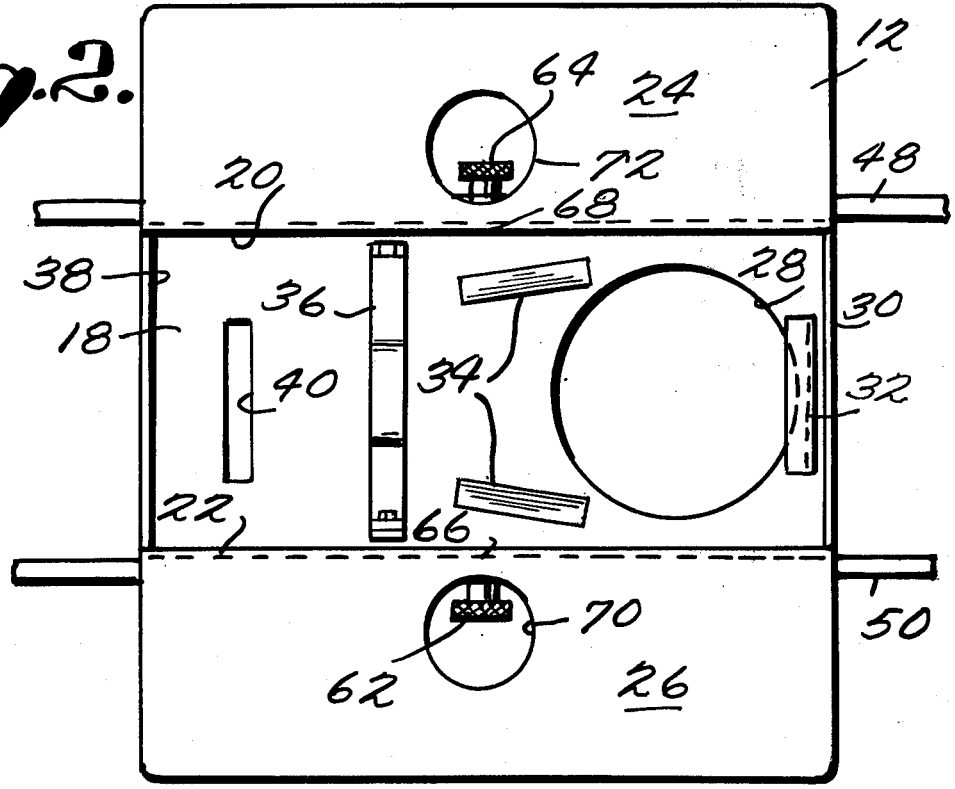
FIG. 2 is a top plan view of the platform of the carriage and a portion of the frame.

As shown in FIG. 2, the bed portion 18 of the platform 12 is provided with a relatively large aperture or opening 28 adjacent the front wall 30 of the platform 12. Between the front wall 30 and the aperture 28, there is secured a flanged abutment member 32 which is provided for engaging the front edge of the housing 16 when the trimming device 14 is placed on the bed portion 18 as shown more clearly in FIG. 1. Extending backwardly at a slight angle relative to the aperture 28 are upstanding flanges 34 on bed portion 18. The flanges 34 are provided for engaging the side edges of the housing 16, also as illustrated in FIG. 1. To the rear of the flanges 34, there is provided a hinged clamping bar 36 which can be opened and closed over the rear portion of the housing 16 to clamp the housing of the trimming device securely in place on the bed portion 18 of platform 12.

Between the clamping device 36 and the rear wall 38 of the bed portion 18 a transverse aperture 40 may be provided to accommodate those types of trimming devices which are provided with a depending flange. Some models of grass trimming devices locate a cable cutting blade on the dependent flange to limit the maximum extension of the cable from the rotor of the motor.

Turning now to FIG. 3, the frame means 42 will be described.

Frame means 42 includes a front transverse axle housing frame member 44 which may be a hollow, rectangularly-shaped in cross-section tube. A substantially identical rear transverse frame member 46 is provided and a pair of parallel extending frame members 48 and 50 are rigidly secured at the respective ends to the frame members 44 and 46 as illustrated in FIG. 3. Each of the parallel transverse frame members 44 and 46 are provided with pairs of set screws 52, the purpose of which will be described hereinafter. The frame members 48 and 50 are preferably hollow, rectangularly cross-sectioned tubes which are provided intermediate their ends with elongated through slots 54 which extend parallel to the axes of the frame members 48 and 50.

As shown more clearly in FIG. 4, each of the wheels 56 is rotatably mounted on the end of a stub axle 58 which is rigidly secured to a separate main axle bar 60. Each of the stub axles 58 is offset as by being bent, as illustrated, from the longitudinal axis of its main axle bar 60. Each main axle bar 60 is of a dimension such that it will easily slide into and out of the hollow transverse frame member 44 for the front wheels and 46 for the rear wheels. Thus, by withdrawing a main axle bar 60 completely from the associated frame member, the vertical height of the carriage above the ground can be adjusted by rotating each of the main axle bars by ninety increments so that the associated stub axle 58 will position the associated wheel 56 at a desired elevation below the carriage body. Further, the lateral spacing between the front wheels and the rear wheels can be varied, as needed, by the appropriate positioning of each main axle bar 60 relative to the frame member 44 before tightening the associated set screw 52.

With the platform 12 positioned on the frame means 42 as illustrated in FIG. 1, an operator may place a grass trimming device 14 on the bed portion 18 with the rotor and cutting cable extending through the aperture 28. For cutting operations along paths where there are no structural obstacles, the platform 12 may be situated midway between the front and rear transverse frame members 44 and 46 as illustrated in FIG. 1. However, when it is desired to trim grass around objects such as lawn furniture, along walls or shrubs, an operator may slide the platform 12 on the frame members 48 and 50 toward the front transverse frame member 44 to a position such as illustrated in FIG. 4. It will be seen that the width of the bed portion 18 is slightly less than the perpendicular distance between the facing surfaces of the frame members 48 and 50. The underside of the guard walls 24 and 26 securely support the platform 12 for this sliding motion.

In order to secure the platform 12 in a desired position on the frame means, pin means, which preferably are in the form of a pair of oppositely located set screws 62 and 64 are provided. As shown in FIG. 5, the end of set screw 62 extends opposite its enlarged head, extends through slot 54 in frame member 50 and engages a threaded bore 66 in side wall 22 that is spaced from the guard wall so as to be aligned with the slot. A similar threaded bore 68 is located in opposite side wall 20 for receiving the threaded portion of set screw 64. When the set screws 62 and 64 are tightened in their respective bores, the enlarged heads will press the respective frame members 48 and 50 against the outside surface of the respective side walls 20 and 22 to securely hold the platform 12 in place. To facilitate access to the enlarged heads of set screws 62 and 64, the respective guard walls 24 and 26 may be apertured as at 70 and 72.

Where the trimming device 14 is provided with its own handle such as at 74, in many circumstances, a separate handle for the carriage 10 may not be necessary. However, where the handle 74 is inadequate or where it is removable, the frame means 42 may be supplied with a handle 76 which may be pivotably mounted on a yoke 78 secured to transverse rear frame member 46.

For durability, it will be obvious to those skilled in the art that the platform 12 and frame means 42 may be made from stamped metal parts but it is also within the scope of the present invention to employ rigid plastic materials for the various frame members as well as the platform 12.

Having described the invention, it will be apparent to those skilled in this art that various modifications may be made thereto without departing from the spirit and scope of the invention as defined in the appended claims.

What is claimed is:

1. A carriage for a trimming device of the type having a motor, a housing for the motor, a cutting element in the form of a length of cable connected to said motor so as to be rotatable about an axis at high speed for cutting grass, weeds and the like, said carriage comprising:

a platform having a top and a bottom side, an aperture in said platform for receiving and supporting the motor driven trimming device with the cutting element located on said bottom side and the housing located on the top side thereof, said platform having releasable clamping means for holding the trimming device thereon, frame means for supporting said platform, said frame means having front and rear ground engaging wheel means spaced apart a selected distance on said frame means, said frame means including a pair of substantially parallel arms extending between said front and rear wheel means and spaced apart a selected distance, said platform having a pair of substantially parallel guide wall means spaced apart a distance slightly less than said selected distance so that said pair of guide wall means is disposable between said parallel arms of said frame means and slidable with said platform with respect to said arms over at least a said portion of said selected distance toward and away from said front wheel means, releasable gripping means for securing said platform on said frame means in a selected position between said front and rear wheel means.

2. The carriage as claimed in claim 1 wherein each said arm is provided with an elongated slot therethrough, and each said guide wall means has an aperture therein alignable with said respective slot, said releasable gripping means comprises a pair of pin means each insertable through a respective slot and associated aperture, each said pin means and aperture having retaining means for holding said respective pin means in place.

3. The carriage as claimed in claim 2 wherein said retaining means comprises threads in each said aperture, and each said pin means having threads for engagement with the threads in said respective aperture, each said pin means having, at one end thereof, an enlarged head so that each said pin means can be inserted into a respective slot and aperture to tighten said respective enlarged head against a respective arm of said frame means.

4. The carriage as claimed in claim 2 wherein said frame means includes a hollow arm extending across said parallel arms at the front of said carriage, and having opposite open ends, said front wheel means including a pair of shafts, each having one end slidable into and out of a respective open end of said hollow arm, each said shaft having an opposite end and a wheel rotatably mounted on said opposite end, said hollow arm having a pair of releasable shaft engaging means for holding each said shaft in a selected place with respect to said frame means.

5. The carriage as claimed in claim 4 wherein said hollow arm and said shafts are so shaped in cross-section as to prevent relative axial rotation therebetween.

6. The carriage as claimed in claim 1 wherein said platform has on its top side abutment means for engaging the periphery of the housing of a trimming device.

7. The carriage as claimed in claim 1 or 2 wherein said frame means is provided adjacent said rear wheel means, with a pivotal handle mount to which is secured an elongated, telescoping handle, so that the carriage may be pushed down a steep grassy bank and pulled back up with a minimum of effort.

8. A carriage for a trimming device of the type having a motor, a housing for the motor, a cutting element in the form of a length of cable connected to said motor so as to be rotatable about an axis at high speed for cutting grass, weeds and the like, said carriage comprising:
  a platform having a top and bottom side, an aperture on said platform for receiving and supporting the motor driven trimming device with the cutting element located on said bottom side and the housing located on the top side thereof, said platform having releasable clamping means for holding the trimming device thereon,
  frame means for supporting said platform, said frame means having front and rear ground engaging wheel means spaced apart a selected distance on said frame means, said frame means including a pair of substantially parallel arms extending between said front and rear wheel means and spaced apart a selected distance, said platform having a pair of substantially parallel guide wall means spaced apart a distance slightly less than said selected distance so that said pair of guide wall means is disposable between said parallel arms of said frame means and slidable with said platform with respect to said arms over at least a said portion of said selected distance between said wheel means, each said guide wall having a top edge and a guard wall extending generally laterally from said top edge over said associated arm of said frame means,
  said frame means including releasable gripping means for securing said platform on said frame means in a selected position between said front and rear wheel means, each said guard wall having an opening therethrough to permit access to said releasable gripping means.

* * * * *